UNITED STATES PATENT OFFICE.

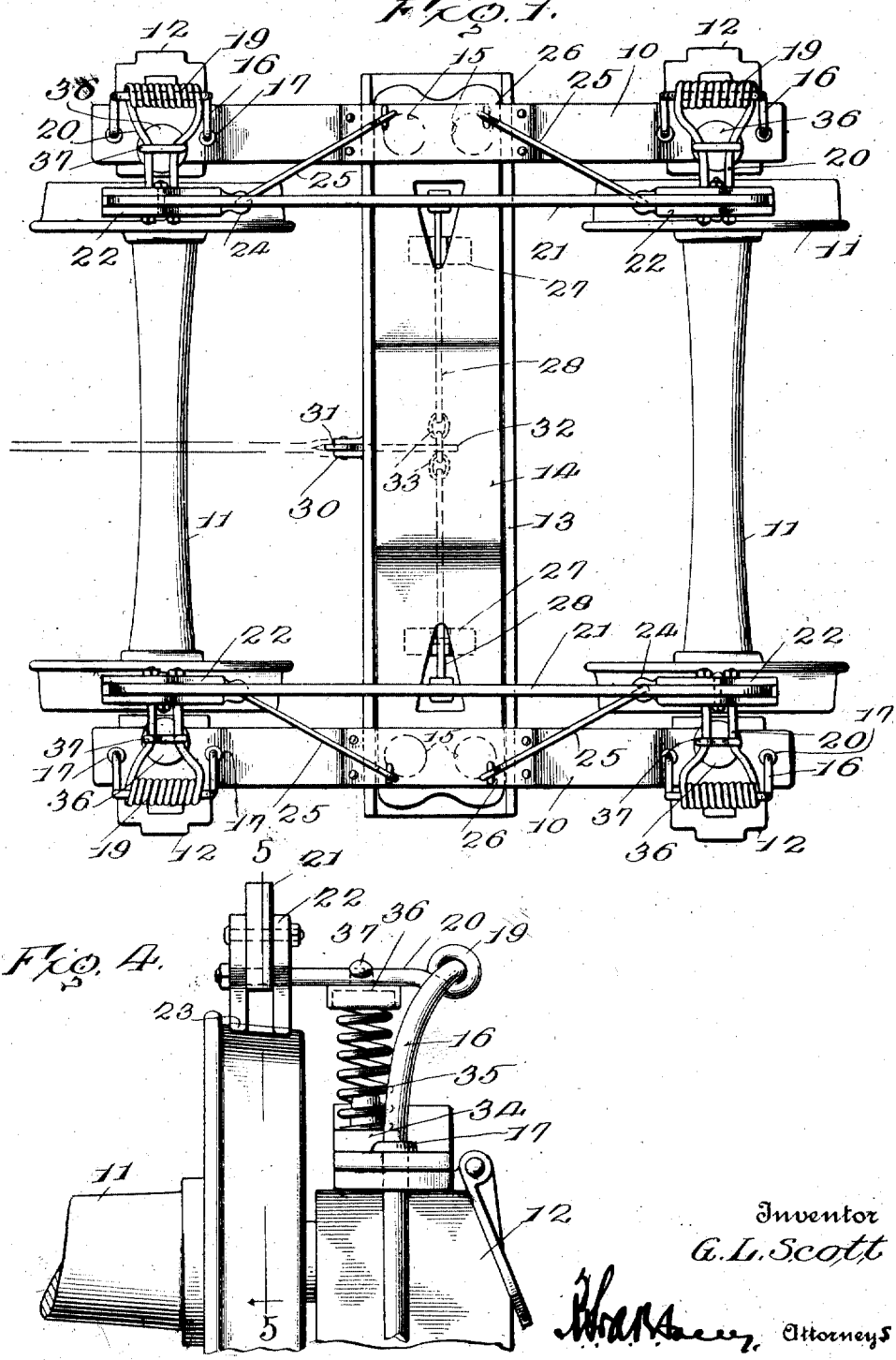

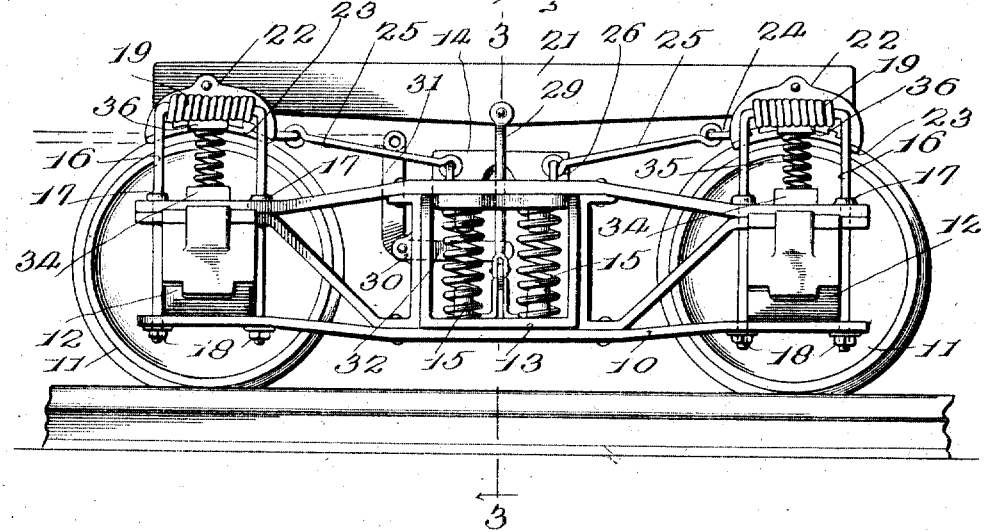
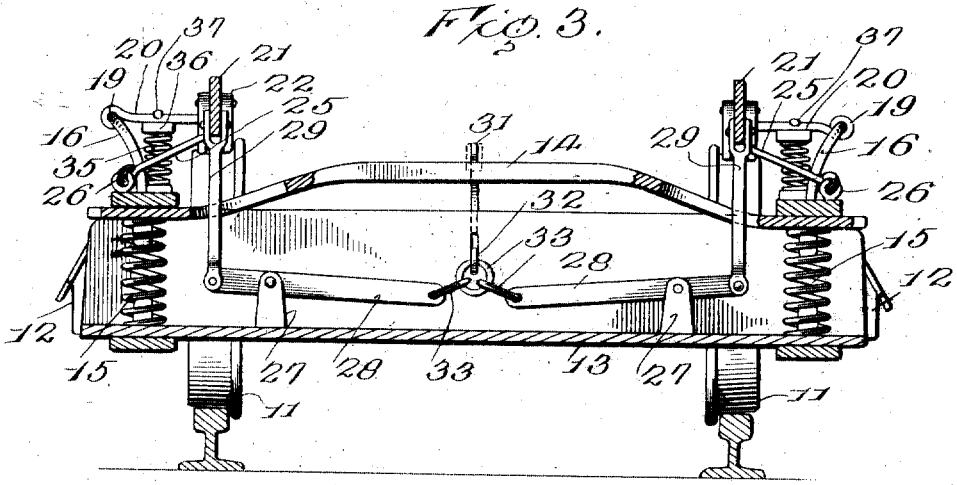

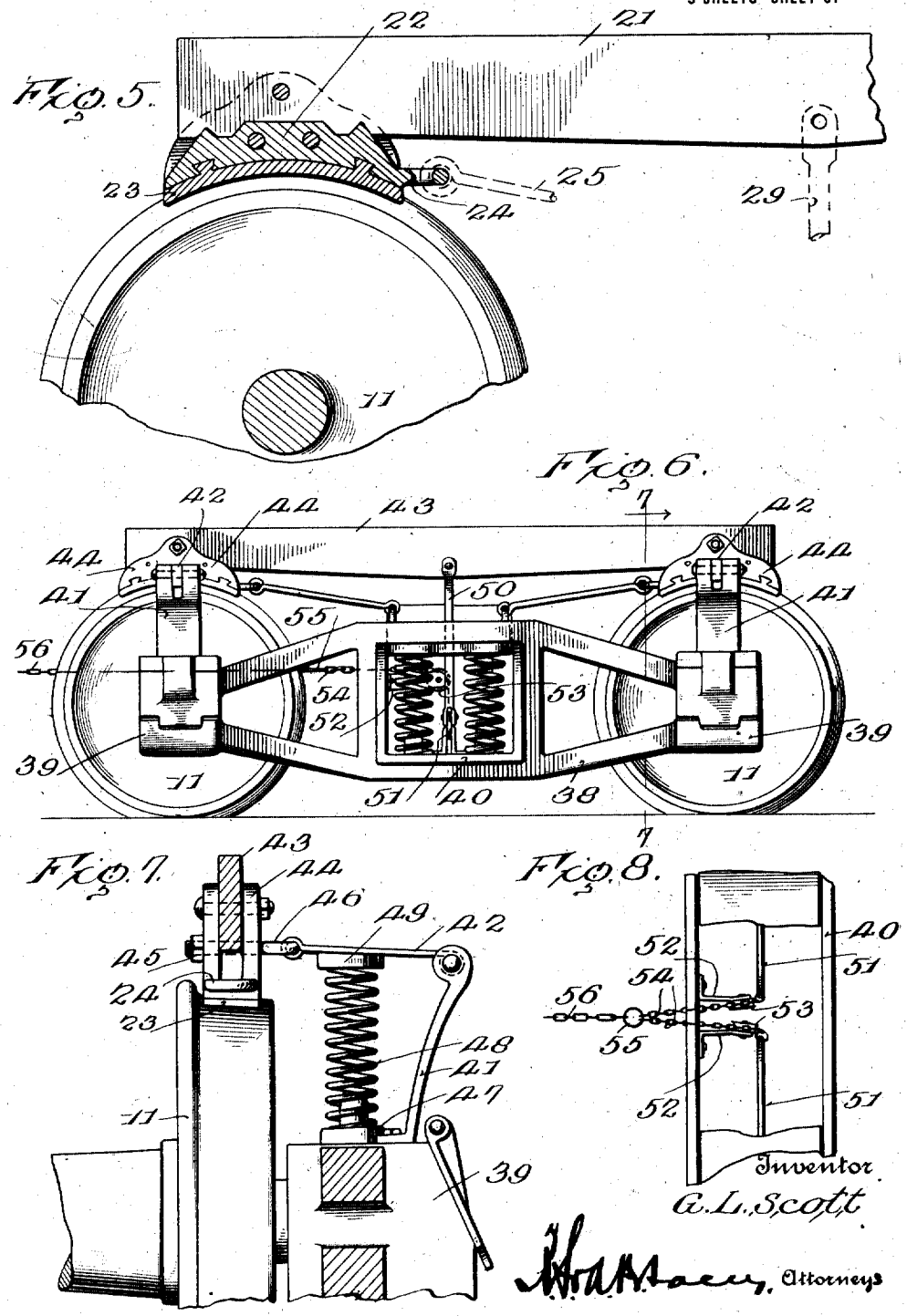

GEORGE L. SCOTT, OF SHAWNEE, OKLAHOMA.

CAR-BRAKE.

1,249,675.  Specification of Letters Patent.  Patented Dec. 11, 1917.

Application filed May 15, 1917. Serial No. 168,710.

*To all whom it may concern:*

Be it known that I, GEORGE L. SCOTT, a citizen of the United States, residing at Shawnee, in the county of Pottawatomie and State of Oklahoma, have invented certain new and useful Improvements in Car-Brakes, of which the following is a specification.

This invention relates to an improved car brake and has as its primary object to provide a construction wherein the brakes will be arranged to bear on top of the car wheels and so connected to the car trucks that when the brakes are applied, tension on the brakes will act to lift up on the trucks so that the desired pressure may be exerted upon the wheels by the brakes without locking the wheels to slip upon the rails.

The invention has as a further object to provide an arrangement wherein should the brake shoes become displaced from the brake heads or become broken off, the said brake shoes will fall to one side of the wheels and will thus not form obstructions upon the track such as very often results with the conventional construction of car brake now in common use, with incident wrecks.

The invention has as a further object to provide a brake wherein should one of the brake heads become displaced from the beam therefor, the said beam cannot drop down to form an obstruction in the path of the car wheels or to drag upon the track with resultant injury to the brake mechanism or to the trackway.

And the invention has as a still further object to provide a construction wherein, when the brakes are set, pressure of the brakes upon the truck wheels will lift upwardly upon the car trucks in direct proportion to the pressure applied to the brakes to thus support a corresponding portion of the weight of the load through the brakes and also relieve the journals, journal boxes, brasses, and arch bars of an equal amount of weight with a consequent reduction in friction upon the journals and lessening of the tendency toward heating of the journal boxes.

Other and incidental objects will appear as the description proceeds and in the drawings wherein I have illustrated the preferred embodiment of the invention and wherein similar reference characters designate corresponding parts throughout the several parts, Figure 1 is a plan view showing a conventional type of car truck equipped with my improved brake mechanism, Fig. 2 is a side elevation more particularly showing the mounting of the brake hanger brackets and the brake beams, Fig. 3 is a sectional view taken on the line 3—3 of Fig. 2 and particularly showing the lever employed for applying the brakes, Fig. 4 is a fragmentary front elevation showing one of the brake hanger brackets and the mounting of the springs employed for normally holding the brakes away from the truck wheels, Fig. 5 is a sectional view taken on the line 5—5 of Fig. 4 particularly showing the mounting of the brake heads and brake shoes, Fig. 6 is a side elevation showing a slightly modified form of the invention, Fig. 7 is a fragmentary sectional view taken on the line 7—7 of Fig. 6 and showing the type of brake hanger bracket employed in connection with the modification, and Fig. 8 is a fragmentary plan view partly broken away to show the arrangement of the chains used in connection with the modified form of the invention for engagement with the levers for applying the brakes.

Referring more particularly to the drawings, I have shown my improved brake mechanism in connection with a conventional type of car truck including the side frames 10 between which extend the truck wheels 11. The side frames are formed with the usual upper and lower arch bars to receive the journal boxes 12 for the wheels. Extending between the side frames is a transom 13 in which is mounted a bolster 14 and arranged within the transom at the extremities of the said bolster are the springs 15 for yieldably supporting the said bolster.

Coming now more particularly to the subject of the present invention I employ a pair of substantially U-shaped brake hanger brackets 16 at opposite sides of the truck. The arms of these brackets are fitted through the arch bars of the side frames of the truck to embrace the journal boxes 12. Formed on the arms of the said bracket are lugs or stops 17 arranged to abut the uppermost arch bars of the said side frames and screw threaded upon the lower extremities of the said arms are nuts 18 adjustable for securing the extremities of the arch bars of the respective side frames and rigidly connecting the said arch bars with the journal boxes 12. The brackets 16 are arranged to project upwardly from the journal boxes and are, as particularly shown in Fig. 3 of the drawings, curved outwardly toward their upper extremities. Swingingly connected to the pairs of brake hanger brackets at opposite sides of the truck are pairs of brake hangers which, as illustrated in the drawings, are each preferably formed from a length of suitable metallic rod bent helically intermediate its ends to form a sleeve 19 having spaced arms 20 extending from the extremities thereof. The sleeves 19 of the brake hangers are loosely fitted upon the bight portions of the brackets 16 and connected to the arms 20 of the said pairs of hangers respectively are brake beams 21 arranged above the truck wheels.

The brake beams 21 are thus swingingly supported by the brake hangers and suitably connected to the extremities of the said brake beams are the brake heads 22 arranged directly over the truck wheels. Mounted upon the brake heads in any approved manner are brake shoes 23 arranged to contact with the truck wheels. At their inner ends, the brake heads 22 are formed with lugs 24 and connected at their outer ends with the said lugs are thrust rods 25 secured at their inner ends to upstanding lugs 26 upon the uppermost arch bars of the side frames of the truck. The rods 25 are thus adapted to hold the brake shoes and brake beams against movement in either direction under the influence of the turning movement of the truck wheels.

Mounted within the transom 13 adjacent opposite extremities thereof, as particularly shown in Fig. 3, are upstanding brackets 27 and pivotally connected with these brackets are levers 28 extending longitudinally within the transom. Secured to the outer ends of the said levers and projecting through suitable openings in the bolster 14 are links 29 pivotally connected to the brake beams 21 at points substantially midway the ends thereof. Projecting laterally from one side of the transom 13 are spaced lugs 30 and pivotally mounted between these lugs is a bell crank lever having an upstanding arm 31 and a lateral arm 32 projecting into the transom, through a suitable opening in the adjacent side thereof, at a point between the inner ends of the levers 28. Connecting the arm 32 of the bell crank lever with the said levers are a plurality of coacting links 33.

The arm 31 of the bell crank lever is adapted to receive the connecting rod from the brake cylinders where the mechanism is to be pneumatically operated and is also adapted to receive proper connection for operating the brakes by hand, as will be readily understood. Leverage applied to the arm 31 of the bell crank lever will swing the arm 32 thereof upwardly and act upon the levers 28 to pull downwardly upon the brake beams 21 and apply the brakes to the truck wheels. In this connection, particular attention is directed to the fact that since the levers 28 are connected directly with the transom 13, these levers will lift upwardly upon the truck frame in direct proportion to the pressure applied to the brakes. The load upon the truck wheels will be correspondingly relieved at the journal boxes 12 and since the brake shoes are arranged to bear on top of the wheels and will thus consequently tend to hold the wheels against the rails, the brakes may be applied with any reasonable force without danger of locking the wheels and slipping the wheels upon the rails. This feature of the present invention is one of important advantage since in any instance where a train is composed of full cars as well as empty cars, the brakes may be applied with sufficient force for effectually braking the train without likelihood of slipping the wheels of the empty cars. Furthermore, it is to be observed that since the brake shoes are arranged above the truck wheels, the said shoes should they become broken off or displaced from the brake heads will, under normal circumstances, fall to the sides of the truck wheels instead of directly under the wheels as is now commonly experienced with brake mechanisms of conventional type. By falling to the sides of the wheels, the brake shoes or parts thereof will not obstruct the track to cause incident wrecks or other injury. Also, since the brake beams are arranged above the truck wheels, these beams cannot, should one of the brake heads become displaced, drop down to cause injury to the track-way.

Mounted on the uppermost arch bars of the side frames of the truck over the journal boxes 12 are suitable bosses 34 and fitted within these bosses are preferably helical springs 35. Fitting over the upper extremities of the said springs are sockets 36 formed, as particularly shown in Fig. 4 of the drawings, with upstanding lugs 37 engaging over the arms 20 of the brake hangers. The springs 35 are thus mounted to swing the brake hangers upwardly and accordingly elevate the brake beams and normally hold the brake shoes away from the truck wheels.

In Figs. 6, 7 and 8 of the drawings I have shown a slight modification of the invention which relates more particularly to the type of brake hanger brackets employed as well as the connection with the levers for applying the brakes. In this modification, a conventional truck side frame is shown at 38. The extremities of this frame carry the journal boxes 39 and connected with the frame midway the ends thereof, is a transom 40. Secured to the journal boxes in any approved maner are upstanding brake hanger brackets 41 to the uper extremities of which are swingingly connected suitable links or brake hangers 42. Arranged above the truck wheels are the brake beams one of which is shown at 43 and connected to the extremities of the said beam are the brake heads 44. Fitted through the brake heads and through the beam 43 are bolts 45 the outer terminals of which are formed with loops or heads 46 to which are swingingly connected the brake hangers 42. It will be seen that this provides a convenient arrangement for mounting the brakes upon the type of truck side frame shown. Moreover, it will be noted that the brake hangers are connected directly to the brake heads with the connecting bolts 45 for the said hangers also acting to secure the brake heads upon the brake beams. Formed on the journal boxes 39 or otherwise secured thereto are suitable bosses 47 in which are arranged helical springs 48 and fitted over the upper extremities of the said springs are sockets 49 secured to the brake hangers 42. The springs 48 will thus normally act to hold the brake heads away from the truck wheels. Extending through the bolster of the transom as in the preferred form of the invention are links 50 connected at their upper extremities to the brake beams and secured at their lower extremities to levers 51 arranged within the transom. These levers 51 are identical with the levers 28 previously described. Mounted within the transom above the meeting ends of the said levers are brackets 52 upon which are mounted pulleys 53. Trained over these pulleys and secured to the said levers are chains 54. At their outer ends, these chains are detachably connected with a ring or other suitable loop 55 upon a chain or other approved connecting element 56 between the ring 55 and the source of power for applying the brakes. When both of the chains 54 are connected with the ring 55, the brake beams at opposite sides of the truck may be moved to engage the truck wheels. However, should the brake shoes associated with one of the brake beams become displaced or impaired or if for any other reason it were desired to render the brakes at one side of the truck inactive, the corresponding chain 54 may be detached from the ring 55 for readily accomplishing this result.

It will therefore be seen that I provide a particularly efficient construction for the purpose set forth and a brake mechanism which may be installed upon substantially any conventional type of car truck as now in common use.

Having thus described the invention, what is claimed as new is:

1. A car brake including brake hanger brackets mounted upon a truck of the car, brake hangers swingingly connected to the said brackets to project over the wheels of the truck at one side thereof, a brake beam carried by the said hangers and arranged above corresponding wheels of the truck, brake heads carried by the said beam, and means connected with the truck and operatively engaged with the said beam for shifting the brake heads toward the said truck wheels.

2. A car brake including coacting brake hanger brackets upstanding from a truck of the car at one side of the truck, brake hangers swingingly connected to said brackets, a brake beam supported above the wheels of the truck at the said side thereof, brake heads carried by the said beam, and means connected with the brake beam for shifting the said beam downwardly to operatively engage the brake heads with the said wheels of the truck and connected with the truck for lifting up thereon by the downward pressure applied to the said brake heads.

3. A car brake including coacting brake hanger brackets mounted upon a truck of the car, brake hangers swingingly connected to said brackets, a brake beam carried by said hangers above the adjacent wheels of the truck, brake heads carried by said brake beam, a lever mounted upon the truck, and connecting means between the said lever and the brake beam, the lever being operable for pulling downwardly upon the brake beam to operatively engage the brake heads with the said wheels of the truck and for lifting upwardly upon the truck by the downward pressure applied to the said brake heads.

4. A car brake including brake hanger brackets fitted through the arch bars of a side frame of a truck of the car and connecting the adjacent journal boxes of the truck with the said frame, brake hangers swingingly connected to the said brackets, a brake beam carried by said hangers above the wheels of the truck at the adjacent side thereof, brake heads carried by the said beam, and means mounted upon the truck and operatively engaged with the brake beam for shifting the said beam downwardly and moving the brake heads to operatively engage the upper sides of the said truck wheels.

5. A car brake including brake hanger brackets upstanding from a truck of the car, brake hangers bent intermediate the ends thereof to provide sleeves engaged with the said brackets and swingingly supporting the hangers thereon, a brake beam carried by the said hangers above the adjacent wheels of the truck, brake heads carried by the said beam, and means mounted upon the truck and operable for pulling downwardly upon the said brake beam and shifting the said brake heads to operatively engage the upper sides of the said truck wheels.

6. The combination with a car truck having side frames each including a plurality of arch bars, and journal boxes carried by the said frame for the wheels of the truck, of a brake carried by the said truck, the said brake including brake hanger brackets having arms fitted through the said arch bars at opposite sides of the said journal boxes and connecting the journal boxes with the frames, brake hangers swingingly mounted upon the said brackets, brake beams carried by the said hangers above corresponding wheels of the truck at opposite sides thereof, brake heads carried by the said brake beams, and means mounted upon the truck and operatively engaged with the said brake beams for pulling downwardly thereon and shifting the brake heads to operatively engage the upper sides of the truck wheels.

7. A car brake including brake hanger brackets mounted upon a truck of the car, brake hangers swingingly connected to the said brackets, a brake beam carried by the said hangers, brake heads carried by the said beam and arranged above the adjacent wheels of the truck, yieldable means bearing between the truck and the said hangers for normally holding the brake heads away from the truck wheels, and means mounted upon the truck and engaged with the brake beam for pulling downwardly upon the beam and shifting the said brake heads to operatively engage the upper sides of the said truck wheels.

8. A car brake including upstanding brake hanger brackets mounted upon a truck of the car, brake hangers swingingly connected to the said brackets, a brake beam carried by said hangers above the adjacent wheels of the car, brake heads carried by the said beam, thrust rods between the said brake heads and the truck for holding the brake beam against longitudinal movement with respect to the truck, and means mounted upon the truck and connected with the brake beam for pulling downwardly upon the said beam and shifting the brake heads to operatively engage the upper sides of the said truck wheels.

In testimony whereof I affix my signature.

GEORGE L. SCOTT. [L. S.]